United States Patent

Nishigori et al.

[11] Patent Number: 5,734,630
[45] Date of Patent: Mar. 31, 1998

[54] DISK REPRODUCING DEVICE AND A REMOTE CONTROL DEVICE THEREFOR

[75] Inventors: Tadasu Nishigori; Takayuki Shimizu, both of Hamamatsu, Japan

[73] Assignee: Yamaha Corporation, Hamamatsu, Japan

[21] Appl. No.: 579,311

[22] Filed: Dec. 27, 1995

[30] Foreign Application Priority Data

Jan. 18, 1995 [JP] Japan ................. 7-023398

[51] Int. Cl.⁶ ........................................ G11B 17/22
[52] U.S. Cl. ................................ 369/36; 369/33
[58] Field of Search .................. 369/30, 38, 36, 369/34, 192, 178, 24, 33, 37, 39, 14, 47, 32, 29

[56] References Cited

U.S. PATENT DOCUMENTS

| | | | |
|---|---|---|---|
| 4,677,604 | 6/1987 | Selby, III et al. | 369/33 |
| 4,872,151 | 10/1989 | Smith | 369/14 |
| 4,899,326 | 2/1990 | Takeya et al. | 369/36 |
| 5,250,787 | 10/1993 | Arii et al. | 369/47 X |

Primary Examiner—Ali Neyzari
Attorney, Agent, or Firm—Loeb & Loeb LLP

[57] ABSTRACT

A disk reproducing device holding a plurality of disks in disk housing spaces and selecting one of the disks from a desired one of the disk housing spaces for reproduction includes a bar code reader, a disk housing address detection circuit for detecting an address of a disk housing space in which a disk to be reproduced is housed, a bar code information/address information storage circuit for storing bar code information provided individually to each of the disks housed in the disk housing spaces and, as a pair with this bar code information, address information of the disk housing space in which said disk is housed, a storage control circuit for storing, during a bar code information storage mode, bar code information of each of the disks read by the bar code reader and, as a pair with this bar code information, address information of the disk housing space housing said disk in the bar code information/address information storage circuit, and a disk reproducing circuit for reading, during a disk reproduction mode, address information of the disk housing space corresponding to the bar code information read by the bar code reader from the bar code information/address information storage circuit and reproducing the disk housed in the disk housing space corresponding to the address information.

7 Claims, 4 Drawing Sheets

DISK REPRODUCING DEVICE AND A REMOTE CONTROL DEVICE THEREFOR

BACKGROUND OF THE INVENTION

This invention relates to a disk reproducing device including an automatic disk changer such as a compact disk (CD) changer and a mini disk (MD) changer and, more particularly, to a disk reproducing device of this type capable of readily searching and reproducing a selected disk from among a plurality of disks housed in the main body of the disk reproducing device.

For a disk reproducing device of an automatic disk changer type where a particular disk is searched and reproduced from among a plurality of disks housed in the disk reproducing device, it is important the capability of searching a desired disk easily. In searching for a desired disk, a prior art disk reproducing device is arranged, as shown in FIG. 2 according to titles of disks housed in respective housing addresses (i.e., disk numbers) which are inputted by means of character input keys 12 provided in the main body 10 of a disk reproducing device. These titles are stored together with their; disk numbers in a memory. In the reproduction of a disk, a title corresponding to the disk to be reproduced is read from the memory by inputting a corresponding disk number by means of ten keys 14. The title is displayed in a display 15 and the corresponding disk is automatically selected and reproduced.

There is another prior art disk reproducing device in which, as shown in the plan view of FIG. 3, a part 18a of a top window 18 of a main body 16 of the disk reproducing device is made of a transparent material. In reproduction of a disk, a user rotates a magazine 20 while watching it and thereby moves a desired one of plural disks 22 to a position where pick-up 24 is located for reproduction.

According to the disk changer of FIG. 2, it is necessary to input a title disk by disk, and it becomes troublesome to input a title for each disk by a key inputting operation, especially as the number of disks to be housed increases. Further, when the address of a housing space where a desired disk is housed is not known, the user must search by sequentially checking disk numbers while watching a title displayed in the display 15 and this searching is not always an easy one.

According to the disk changer of FIG. 3, the user must select a desired disk by watching labels of the disks 22 while rotating the magazine 20 and this searching is very troublesome. Further, a desired disk cannot be selected unless the user directly handles the disk changer.

It is, therefore, an object of the invention to provide a disk reproducing device and a remote control device therefor capable of readily searching and reproducing a desired disk.

SUMMARY OF THE INVENTION

For achieving the above-described object of the invention, there is provided a disk reproducing device holding a plurality of disks in disk housing spaces and selecting one of the disks from a desired one of the disk housing spaces for reproduction comprising a bar code reader. A disk housing address detection means detects an address of a disk housing space in which a disk to be reproduced is housed, bar code information/address information storage means for storing bar code information provided individually to each of the disks housed in the disk housing spaces and, as a pair with this bar code information, and address information and of the disk housing space in which said disk is housed. Storage control means stores, during a bar code information storage mode, bar code information of each of the disks read by the bar code reader and, as a pair with this bar code information, address information of the disk housing space housing said disk in the bar code information/address information storage means. Disk reproducing means for reading, during a disk reproduction mode, reads address information of the disk housing space corresponding to the bar code information read by the bar code reader from the bar code information/address information storage means and reproduces the disk housed in the disk housing space corresponding to the address information.

According to the invention, since bar code information provided individually to each of the disks housed in the disk housing spaces is stored as a pair with address information of the disk housing space which the disk is housed, a desired disk can be reproduced during a disk reproduction mode by reading the bar code provided individually to the disk by the bar code reader and reading the address information of the disk housing space corresponding to the bar code information from the bar code information/address information storage means. Accordingly, by only preparing for bar code information for each of disks housed in the disk housing spaces, a desired disk can be easily searched and reproduced whereby a troublesome searching operation, where there is a large number of disks housed in the disk reproducing device, can be eliminated and the time required for searching a desired disk can be shortened.

This bar code information may be information of a bar code for commodity control attached to a disk case. In this case, since a desired disk can be searched by utilizing a bar code attached normally to a disk case for commodity control, no special bar code needs to be provided to each disk so that searching can be made in a simple manner.

In one aspect of the invention, a disk reproducing device holding a plurality of disks in disk housing spaces and selecting one of the disks from a desired one of the disk housing spaces for reproduction comprises a bar code reader, a remote control device having transfer means for transferring bar code information read by the bar code reader to a main body of the disk reproducing device, disk housing address detection means for detecting an address of a disk housing space in which a disk to be reproduced is housed, bar code information/address information storage means for storing bar code information provided individually to each of the disks housed in the disk housing spaces and, as a pair with this bar code information, address information of the disk housing space in which said disk is housed, storage control means for storing, during a bar code information storage mode, bar code information of each of the disks read and transferred by the remote control device together with address information of the disk housing space housing said disk in the bar code information/address information storage means, and disk reproducing means for reading, during a disk reproduction mode, address information of the disk housing space corresponding to the bar code information read and transferred by the remote control device from the bar code information/address information storage means and reproducing the disk housed in the disk housing space corresponding to the address information.

According to this aspect of the invention, a bar code is read by the bar code reader incorporated in the remote control device and transferred to the main body of the disk reproducing device. Therefore, the user can search and reproduce a desired disk from a location remote from the main body of the disk reproducing device.

In this case also, the bar code information may be information of a bar code for commodity control attached to a disk case.

In another aspect of the invention, there is provided a remote control device for a disk reproducing device holding a plurality of disks in disk housing spaces and selecting one of the disks from a desired one of the disk housing spaces for reproduction comprising, a bar code reading section, disk housing address information input means for inputting address information of disk housing spaces in which respective disks are housed, bar code information/address information storage means for storing bar code information provided individually to each of the disks housed in the disk housing spaces and, as a pair with this bar code information, address information of the disk housing space in which said disk is housed, storage control means for storing, during a bar code information storage mode, bar code information of each of the disks read by the bar code reading section and, as a pair with this bar code information, address information of the disk housing space housing said disk inputted by the disk housing address information input means in the bar code information/address information storage means, and address information control means for reading, during a disk reproduction mode, address information of the disk housing space corresponding to the bar code information read by the bar code reading section from the bar code information/address information storage means and transmitting the address information to the main body of the disk reproducing device.

According to this aspect of the invention, the bar code reading section and the bar code information/address information storage means are provided in the remote control device, and the functions of the present invention can be realized even in a currently existing disk reproducing device without providing any extra device in the disk reproducing device.

Preferred embodiments of the invention will be described below with reference to the drawings.

BRIEF DESCRIPTION OF THE DRAWINGS

In the accompanying drawings.

DESCRIPTION OF PREFERRED EMBODIMENTS

Figure 4A:
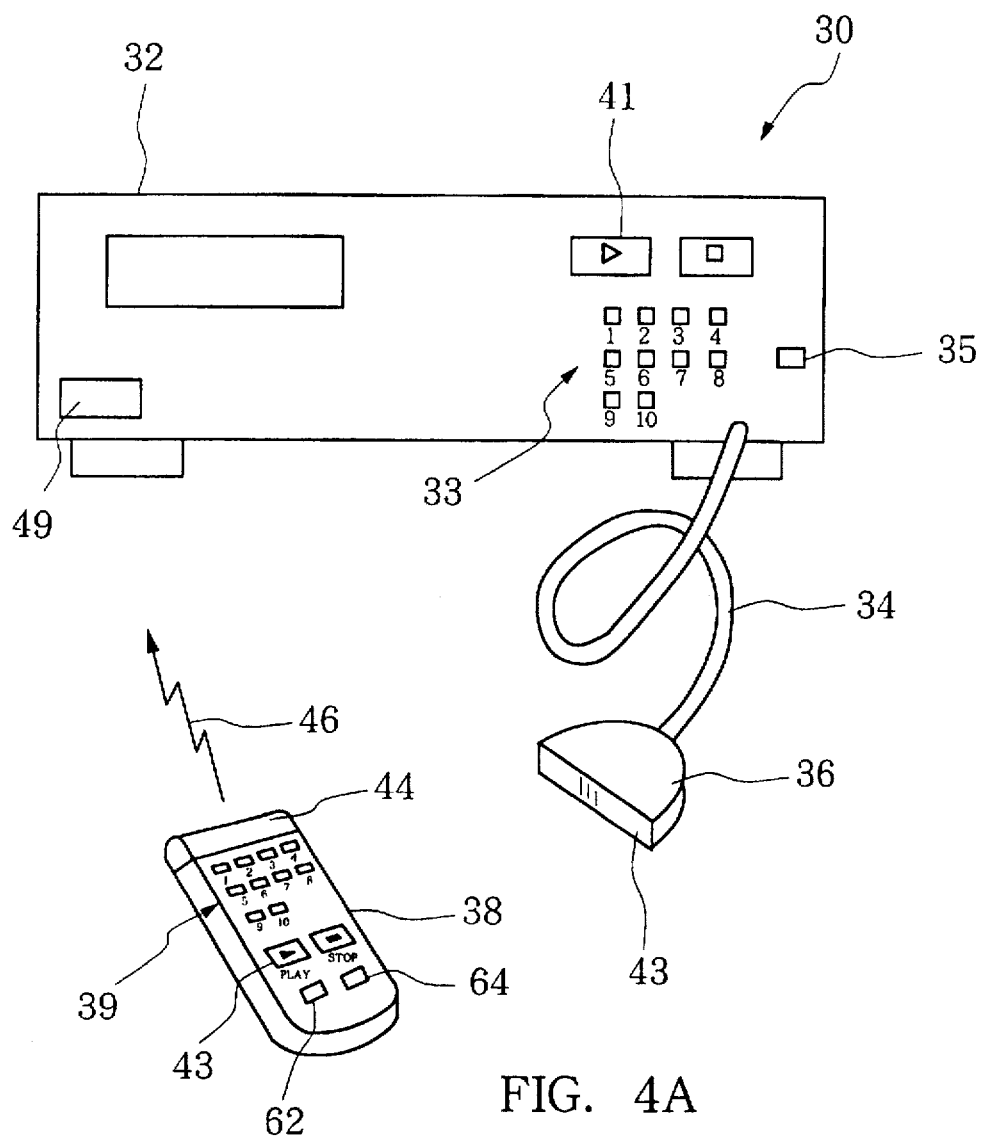
FIG. 4A is a view showing a system of a disk reproducing device having the control structure of FIG. 1.

An embodiment of the invention will now be described. FIG. 4A shows an example of the system structure of a disk reproducing device 30 incorporating the present invention. The disk reproducing device 30 is constructed, for example, as a CD changer and includes a main body 32, a bar code reader 36 connected to the main body 32 through a cable 34 and a remote control device 38 having a function of a bar code reader. Provided in the main body 32 are a disk mounting device (not shown) such as a magazine, a rack or a rouletet table and a plurality of disks detachably housed in a plurality of disk housing spaces formed in this disk mounting device in such a manner that one disk is housed in one disk housing space. An address (i.e., disk number) is given to each disk housing space. Upon designating a disk number by operating ten keys 33, provided in the main body 32 or ten keys 39 provided in the remote control device 38, and depressing a reproduction (play) key 41 or 43, this address is searched and a disk housed in the disk housing space corresponding to this address is drawn out and played back by means of a reproduction unit including a turntable and a pickup. A mode change switch 35 for changing the mode between a storage mode and a reproduction mode is provided in the main body 32.

The bar code reader 36 reads a bar code 42 (FIG. 4B) for commodity management labeled in the form of a seal on a disk case 40 (i.e., a case in which a disk presently housed in the main body 32 was housed) and transmits this bar code to the main body 32 through the cable 34.

The remote control device 38 functions as a normal remote control device for remote controlling the main body 32 and also functions as a bar code reader. The remote control device 38 is formed with an infrared ray remote control signal transmitting section and a bar code reading section in its end portion 44. When the remote control device 38 is used as a bar code reader, the bar code 42 for commodity control is read by the reading section in the end portion 44 and bar code information of this bar code 42 is transmitted, upon receipt of a transmission command, as an infrared ray remote control signal 46 from the infrared ray remote control signal transmitting section in the end portion 44. This infrared ray remote control signal 46 is received by an infrared ray receiving section 49 of the main body 32 and is used in the main body 32 in the same manner as it is used when the bar code is read by the bar code reader 36.

The remote control device 38 includes a mode change switch 62 for changing the mode between a storage mode and a reproduction mode and a transfer key 64 for transferring read bar code information to the main body 32. Either the bar code reader 36 provided in the main body 32 or the one provided in the remote control device 38 may be used instead of the two bar code readers used in the present embodiment.

Figure 1:
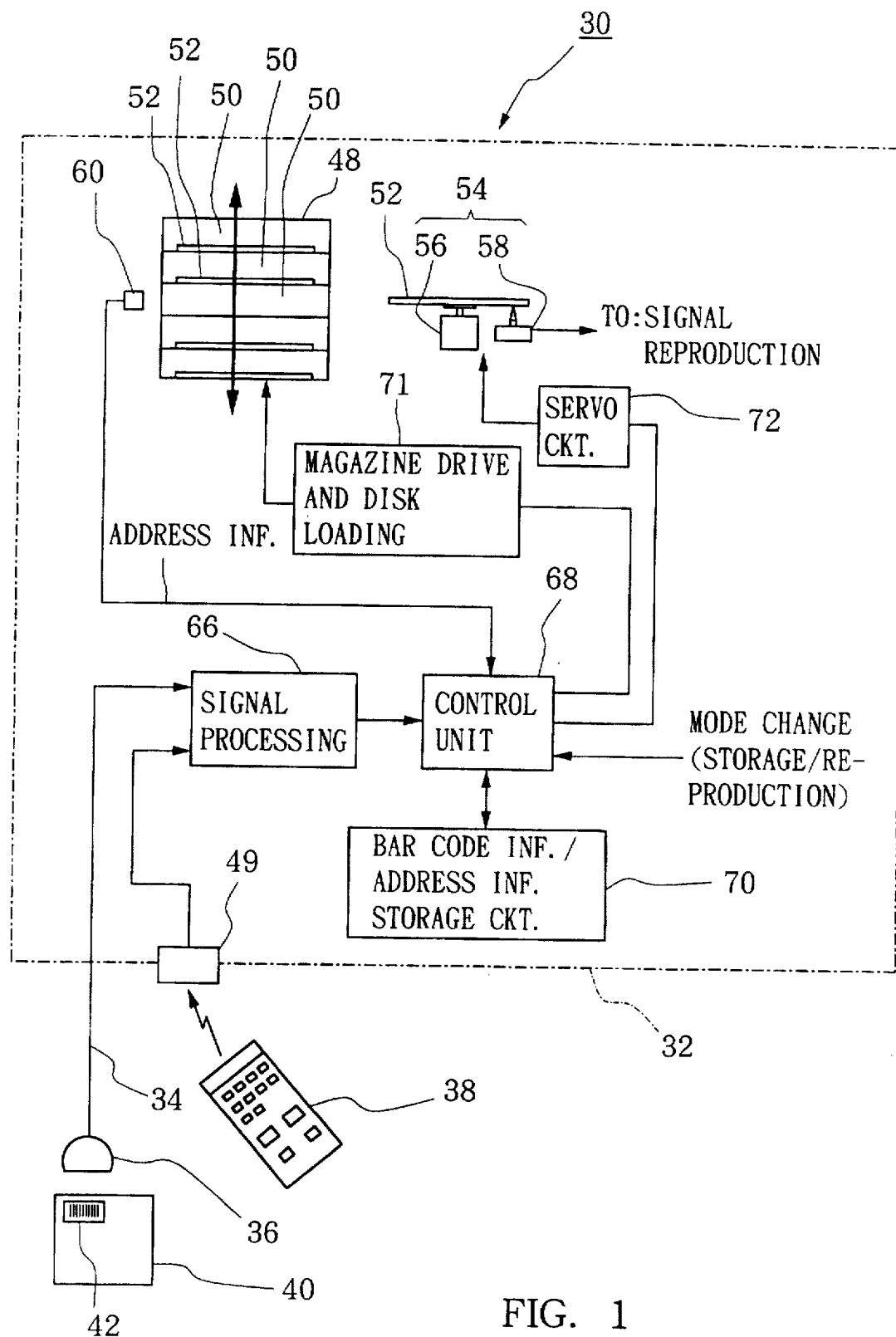
FIG. 1 is a block diagram showing an embodiment of the invention.
Figure 2:
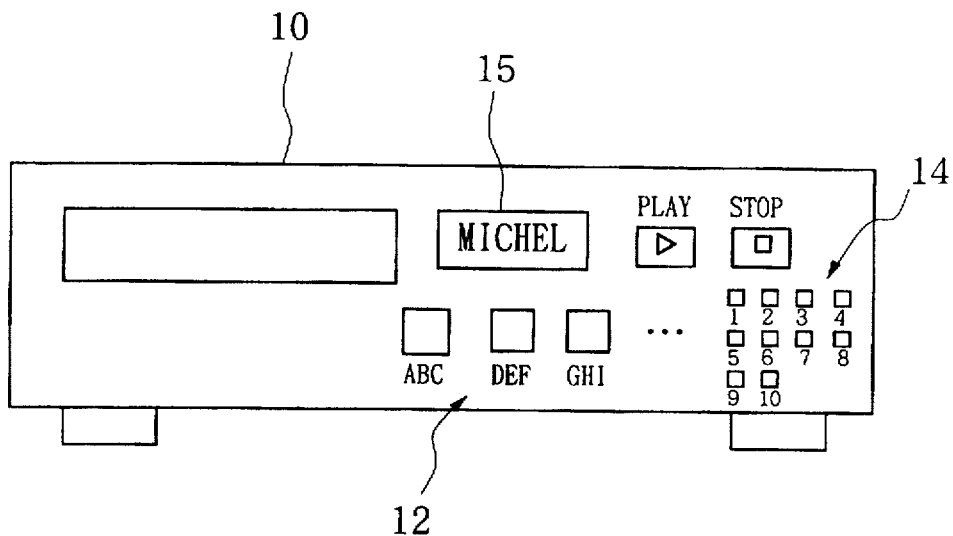
FIG. 2 is a front view showing a prior art disk reproducing device.
Figure 3:
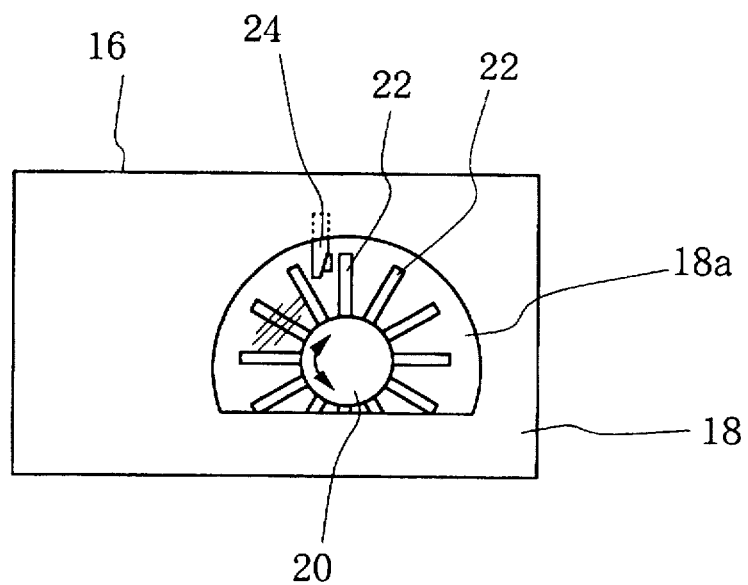
FIG. 3 is a plan view showing another prior art disk reproducing device.
Figure 4B:
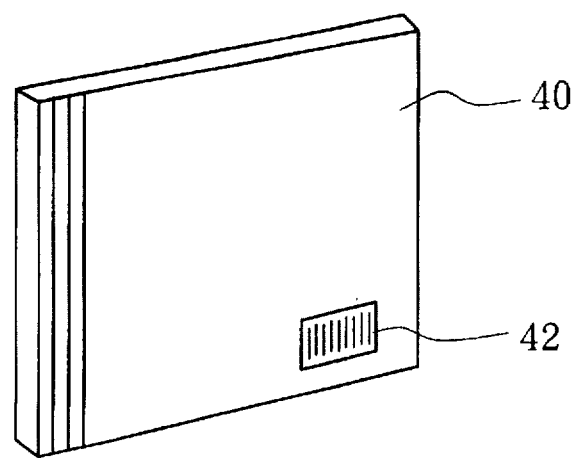
FIG. 4B is a view showing an appearance of a disk case.

An example of a disk search control by the disk reproducing device 30 of FIGS. 4A and 4B is shown in FIG. 1. A plurality of disk housing spaces 50 are formed in a magazine 48, and disks 52 are detachably housed in the disk housing spaces in such a manner that one disk is housed in one disk housing space. The magazine 48 is disposed in the main body 32 in such a manner that the magazine 48 can be vertically moved by a magazine drive and disk loading device 71. One of the disk housing spaces 50 corresponding to the disk number which has been designated as a disk to be reproduced is positioned to a predetermined disk draw-out height, and the disk 52 is drawn out of the disk housing space by the disk loading device 71. The drawn out disk 52 is set on a reproduction unit 54, rotated by a spindle motor 56 and reproduced by an optical pickup 58.

As the disk housing address detection means for detecting the address of the disk housing space 50 in which the disk to be reproduced is housed, an optical or mechanical type disk housing address detection unit 60 is provided in the main body 32.

Bar code information read by the bar code reader 34, or bar code information transmitted by the remote control device 38 and received by the infrared ray receiving section 49, is analyzed by a signal processing circuit 66 and then is applied to a control unit 68. A bar code information/address information storage circuit 70 stores bar code information of each disk 52 housed in each disk housing space 50 of the magazine 48 and, as a pair with this bar code information, address information of the disk housing space 50 in which the particular disk is housed.

In the storage mode, the control unit 68 functions as a storage control circuit and stores bar code information supplied from the signal processing circuit 66 and, as a pair with this bar code information, address information representing the disk housing address supplied separately in a bar code information/address information storage circuit 70. The address information is inputted by operating the ten keys 33 of the main body 32 or ten keys 39 of the remote control device 38 or, alternatively, address information detected by the disk housing address circuit 60 may be utilized.

In the reproduction mode, the control unit 68 functions as a disk reproduction control circuit and, on the basis of bar code information read by the bar code reader 38 or bar code information read and transmitted by the remote control device 38, reads out corresponding address information from the bar code information/address information storage circuit 70. Then, the control unit 68 drives the magazine drive and disk loading device 71 to position the magazine 48 at a height at which the corresponding address can be detected by the disk housing address detection circuit 60, causes the disk 52 to be drawn out of the disk housing space 50 at this height and set on the reproduction unit 52 and controls a servo circuit 72 to perform reproduction of the disk 52.

A series of operations of the disk reproducing device 30 of the above-described construction in the storage mode and the reproduction mode will be described below.

(1) Storage Mode

When the storage operation is performed in the main body 32, the storage mode is set by operating the mode change switch 35. The bar code 42 for commodity control of the disk case 40 is read by the bar code reader 36 and the address information of the disk housing space 50 in which the corresponding disk 52 is housed is inputted by operating the ten keys 33. By adopting an arrangement whereby when bar code information of a disk is stored during reproduction of this disk, address information detected by the disk housing address detection circuit 60 is automatically utilized, and the operation for inputting address information can be omitted.

By commanding storage of bar code information and address information by operating a memory key upon inputting of these information, these information are stored as a pair in the bar code information/address information storage circuit 70 (e.g., by using the bar code information as address, the bar code information is stored at the corresponding address, or data which is a combination of the bar code information and the address information is stored at a desired address). By performing the above-described operation with respect to all of the disks 52 housed in the magazine 48, pairs of the bar code information and the address information of all of the disks 52 are stored in the storage circuit 70.

When the storage operation is performed by the remote control device 38, the storage mode is set by operating the mode change key 60 of the remote control device 38. Then, the bar code 42 for commodity control of the disk case 40 is read and address information is inputted by operating the ten keys 39 and then the transfer key 64 is depressed. The two information are thereby transmitted as a pair (mode information is also transmitted) and transferred to the main body 32 and stored in the bar code information/address information storage circuit 70. When the storage operation is performed during the reproduction of the disk 52, by utilizing address information detected by the disk housing address detection circuit 60, the operation for inputting the address information can be omitted. By performing the above-described operation with respect all of the disks 52 housed in the magazine 48, pairs of the bar code information and the address information of all of the disks 52 are stored in the bar code information/address information storage circuit (2) Reproduction Mode When the reproduction operation is performed in the main body 32, the reproduction mode is set by operating the mode change key 35 (or by not operating it). The bar code 42 of the disk case 40 for the disk 52 which the user wishes to listen to is read by the bar code reader 38 and the play key 41 is depressed. By this operation, address information which constitutes a pair with the read bar code information is read from the bar code information/address information storage circuit 70 and the corresponding disk 52 is drawn out of the magazine 48 and played back.

Figure 5:
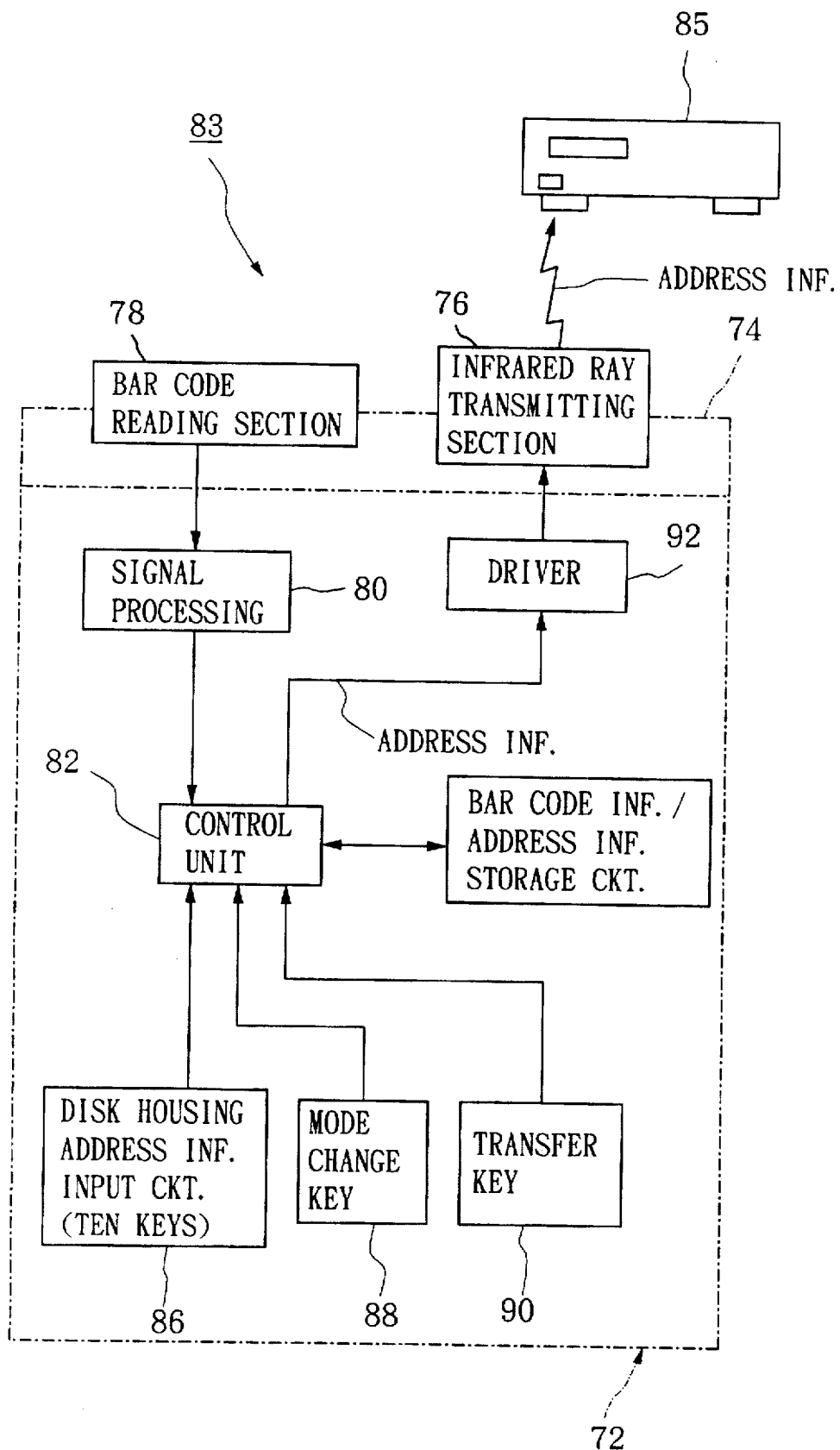
FIG. 5 is a block diagram showing another embodiment of the invention.

Another embodiment of the invention is shown in FIG. 5. In this embodiment, a bar code reading section and a bar code information/address information storage circuit are provided in a remote control device whereby the function of the present invention can be realized in an existing disk changer without the necessity for providing a special device on the side of the main body of the disk reproducing device.

In a disk reproducing device 83 of FIG. 5, a remote control device 72 functions as a normal remote controller for controlling a main body 85 and functions as a bar code reader and is provided in its end portion 74 with an infrared ray remote control signal transmitting section 76 and a bar code reading section 78. When the remote control device 72 is used as a bar code reader, a bar code 42 for commodity control (FIG. 4B) is read by the reading section 78 in the end portion 74. The read signal is analyzed by a signal processing circuit 80 and applied to a control unit 82. A bar code information/address information storage circuit 84 stores, as a pair, bar code information of each disk housed in each disk housing space of a main body 85 and address information of the disk housing space in which the disk is housed.

In the storage mode which is set by operating a mode change key 88, the control unit 82 functions as the storage control means and stores pairs of bar code information supplied by the signal processing circuit 80 and address information representing disk housing address supplied by disk housing address input circuit (ten keys) 86 in the bar code information/address information storage circuit 84.

In the reproduction mode, the control unit 82 functions as the address information transmission control means and reads out corresponding address information from the bar code information/address information storage circuit 84 in accordance with bar code information read by the bar code reading section 78. Upon depression of a transfer key 90, this address information is transmitted from the infrared transmitting section 76 through a driver 92. The main body 85 receives this signal and a control device (reproduction control means) incorporated in the main body 85 actuates a magazine drive and disk loading device to position the magazine at a height at which the corresponding address can be detected by a disk housing address detection circuit. A disk is drawn out of a disk housing space at this height and set on a reproduction unit and a servo circuit is controlled to perform reproduction of the disk.

As described above, by using the remote control device 72 of FIG. 5, no special device is required on the side of the main body 85 but the function of the present invention can be realized in an existing disk changer.

In the above-described embodiments, a bar code for commodity control which is normally attached to a disk case, is utilized. Alternatively, a plurality of bar codes which are exclusively used for the purpose of this invention may be provided in the form of for example, a label which the user may personally stick on the disk cases.

In the above described embodiments, description has been made about a case where disks are housed in a magazine. The invention is also applicable to disk changers in which a roulette table or other type of disk housing device is used.

The invention is applicable not only to disk changers for a CD and a MD but also to disk changers for various other types of disks.

What is claimed is:

1. A disk reproducing device for holding a plurality of disks in disk housing spaces and selecting one of the plurality of disks in the disk housing spaces for reproduction, each of the plurality of disks being housed in one of the disk housing spaces and having a bar code identifying the disk, and each of the disk housing spaces having an address, the disk reproducing device comprising:

a bar code reader for reading the bar code corresponding to each of the plurality of disks;

disk housing address detection means for detecting the address of a disk housing space which houses the selected one of the plurality of disks;

bar code information/address information storage means for storing the bar code of each of the plurality of disks and the address of each disk housing space housing each of the plurality of disks, the bar code being paired with the address of the disk housing space holding the disk corresponding to the bar code;

storage control means for controlling the storing of, during a bar code information storage mode, the bar code of each of the plurality of disks and the address of each disk housing space housing each of the plurality of disks within the bar code information/address information storage means; and disk reproducing means for receiving, during a disk reproduction mode, the bar code of the selected disk selected by scanning the bar code of the selected disk using the bar code reader, retrieving the address of the disk housing space housing the selected disk from the bar code information/address information storage means by using the bar code of the selected disk and reproducing the selected disk by retrieving the disk housed in the disk housing space corresponding to the retrieved address.

2. A disk reproducing device as defined in claim 1, wherein said bar code is a bar code for commodity control attached to a disk case.

3. A disk reproducing device for holding a plurality of disks in disk housing spaces and selecting one of the plurality of disks in the disk housing spaces for reproduction, each of the plurality of disks being housed in one of the disk housing spaces and having a bar code identifying the disk, and each of the disk housing spaces having an address, the disk reproducing device comprising:

a bar code reader for reading a bar code corresponding to each of the plurality of disks;

a remote control device having transfer means for transferring the bar code read by the bar code reader to a main body of the disk reproducing device, the bar code reader being incorporated in the remote control device;

disk housing address detection means for detecting the address of a disk housing space which houses the selected one of the plurality of disks;

bar code information/address information storage means for storing the bar code of each of the plurality of disks and the address of each disk housing space housing each of the plurality of disks, the bar code being paired with the address of the disk housing space holding the disk corresponding to the bar code;

storage control means for controlling the storing of, during a bar code information storage mode, the bar code of each of the plurality of disks and the address of each disk housing space housing each of the plurality of disks within the bar code information/address information storage means; and disk reproduction means for receiving, during a disk reproduction mode, the bar code of the selected disk selected by scanning the bar code of the selected disk using the bar code reader, retrieving the address of the disk housing space housing the selected disk from the bar code information/address information storage means by using the bar code of the selected disk and reproducing the selected disk by retrieving the disk housed in the disk housing space corresponding to the retrieved address.

4. A disk reproducing device as defined in claim 3 wherein said bar code is a bar code for commodity control attached to a disk case.

5. A remote control device for a disk reproducing device holding a plurality of disks in disk housing spaces and selecting one of the plurality of disks in the disk housing spaces for reproduction, each of the plurality of disks being housed in one of the disk housing spaces and having a bar code identifying the disk, and each of the disk house spaces having an address, the remote control device comprising:

a bar code reading section for reading the bar code corresponding to each of the plurality of disks;

disk housing address information input means for inputting the address of each of the disk housing spaces housing each of the plurality of disks;

bar code information/address information storage means for storing the bar code of each of the plurality of disks and the address of each disk housing space housing each of the plurality of disks, the bar code being paired with the address of the disk housing space holding the disk corresponding to the bar code;

storage control means for controlling the storing of, during a bar code information storage mode, the bar code of each of the plurality of disks and the address of each disk housing space housing each of the plurality of disks within the bar code information/address information storage means; and address information control means for retrieving, during a disk reproduction mode, the address of the disk housing space housing the selected one of the plurality of disks from the bar code information/address information storage means and transmitting the address of the selected disk to a main body of the disk reproducing device, wherein the selected disk is selected by scanning the bar code of the selected disk.

6. A method of selecting one of a plurality of disks and reproducing the selected disk using a disk reproducing device holding the plurality of disks in disk housing spaces, each of the plurality of disks being housed in one of the disk housing spaces and having a bar code identifying the disk, and each of the disk housing spaces having an address, the method comprising the steps of:

reading the bar code corresponding to each of the plurality of disks by scanning the bar code using a bar code reader;

inputting the address of each disk housing space housing each of the disks;

storing the bar code and the address in a storage circuit;

pairing the bar code with the address of the disk housing space housing a disk corresponding to the bar code;

selecting a desired disk out of the plurality of disks by scanning the bar code identifying the desired disk;

retrieving from the storage circuit the address of one of the disk housing spaces holding the desired disk by using the bar code of the desired disk;

retrieving the desired disk from the disk housing space having the retrieved address; and reproducing the desired disk.

7. The method of claim 6 further comprising the step of changing to a reproduction mode from a storage mode when selecting the desired disk.

* * * * *